No. 752,296. PATENTED FEB. 16, 1904.
J. J. McGUIRK.
UNALTERABLE DUPLEX TICKET.
APPLICATION FILED JAN. 26, 1903.

NO MODEL.

|  | EAST 39 | 15 CTS | 8 CTS | 5 CTS | EMP. PASS TRANSFER | JAN FEB / MAR APR / MAY JUN / JUL AUG / SEP OCT / NOV DEC | EAST 39 ON REGISTER |
|---|---|---|---|---|---|---|---|
|  |  | 10 CTS | 6 CTS |  |  | 1 2 3 4 5 6 7 8 / 9 10 11 12 13 14 15 16 / 17 18 19 20 21 22 23 24 / 25 26 27 28 29 30 31 |  |

| 0074 |
|---|
| RECEIPT |
| COHOES |
| TROY |
| GREEN IS? |
| RENSSL'R |
| CLINTON AV. |
| HAMILTON ST. |
| DELAWARE AV. |
| PINE HILLS |
| W. ALBANY |
| KENWOOD |
| SCHUYLER BR |

| BOOK NO. 0074 |
|---|
| FARE RECEIPT |
| COHOES |
| TROY |
| GREEN ISLAND |
| RENSSELAER |
| EAST ON CLINTON AVE. |
| EAST ON HAMILTON ST. |
| DELAWARE AVE. |
| PINE HILLS. |
| WEST ALBANY |
| KENWOOD |
| SCHUYLER BRIDGE |

| 39 | 15 CTS | 8 CTS | 5 CTS | EMP. PASS TRANSFER | JAN FEB / MAR APR / MAY JUN / JUL AUG / SEP OCT / NOV DEC | 1 7 13 19 25 / 2 8 14 20 26 / 3 9 15 21 27 / 4 10 16 22 28 / 5 11 17 23 29 / 6 12 18 24 30 |
|---|---|---|---|---|---|---|
|  | 10 CTS | 6 CTS |  |  |  | 31 |

Witnesses
*Lottie Prior*
*Dudley B Wade*

Inventor
*Joseph J. McGuirk*
by *Ward & Cameron* Attys.

No. 752,296.

Patented February 16, 1904.

UNITED STATES PATENT OFFICE.

JOSEPH J. McGUIRK, OF ALBANY, NEW YORK.

UNALTERABLE DUPLEX TICKET.

SPECIFICATION forming part of Letters Patent No. 752,296, dated February 16, 1904.

Application filed January 26, 1903. Serial No. 140,462. (No model.)

*To all whom it may concern:*

Be it known that I, JOSEPH J. McGUIRK, a citizen of the United States of America, and a resident of the city and county of Albany and State of New York, have invented certain new and useful Improvements in Unalterable Duplex Tickets, of which the following is a specification.

My invention relates to duplex tickets adapted especially for use in street-railway service; and the object of my invention is to provide an unalterable duplex ticket so constructed that a portion of the ticket may be torn off, given to the passenger, and the remainder will contain a memorandum of the transaction had between the conductor giving the ticket and the passenger receiving the said portion.

The accompanying drawing is a plan of my ticket.
I preferably arrange in a pad or book a series of tickets numbered consecutively, preferably provided with some means for indicating the direction in which the car is going upon which the ticket is used, and I also preferably arrange upon the ticket a calendar which may be punched at the office when the book or pad of tickets is given to the conductor on the date upon which it is to be used.

I also preferably arrange upon another portion of the ticket a corresponding calendar, as shown in the figure illustrating the ticket. I preferably place the number of the ticket at the upper corner thereof and also at the lower left-hand corner. I designate, preferably at the upper corner thereof, the direction the car is traveling. (Shown in the drawing as being east.) I preferably make the number of the ticket in a different color from that of the printing on the remainder of the ticket.

When a register is used in a car, the number of the ticket should correspond to the number registered. For that reason I sometimes place on the ticket beneath the "No. 39," as shown in the drawing, the words "On Register." I also arrange a calendar which may be conveniently put joining the number and the words indicating the direction in which the car is traveling in the upper right-hand corner of the ticket, by placing the months of the year abbreviated in two columns, as shown in the drawing, and beneath it a calendar of a month arranged to show thirty-one days, by means of which a person giving out the book or pad of tickets to the conductor may punch the month and day, which will indicate the time the ticket was to be used. Beneath the calendar I may place the book-number, as shown in the drawing, which is "0074." Immediately beneath the book-number and along one side of the ticket I place the words "Fare receipt" and the names of the various places to which the car goes and places of meeting with intersecting lines.
Thus beneath "Fare receipt" I place "Cohoes, Troy, Green Island, Rensselaer, east on Clinton Ave., east on Hamilton St., Delaware Ave., Pine Hills, West Albany, Kenwood, Schulyer Bridge." Beneath that on the same side of the ticket, being at the lower right-hand corner, I place a calendar corresponding to the calendar at the upper right-hand corner. Along the upper end of the ticket I place in columns that which is received in payment for transportation. As shown in the drawing, in the right-hand column I place "Emp. pass," indicating employee's pass, in the next column I place the word "Transfer," next to the left of that the figures "5 cts., &c.," indicating that for transportation there will be received by the conductor an employee's pass, a transfer, or one of the sums of money specified in the columns at the upper end of the ticket.
At the lower end of the ticket immediately opposite the columns stating the amount received for transportation is a duplicate thereof. At the upper left-hand corner is arranged the number of the ticket, the direction of its passage, its book-number, and a duplicate of that appearing on the right-hand side of the ticket, being the places to which transportation is given. Beneath that may be placed the number of the ticket. In this manner there is left the central portion of the ticket blank or what is the same thing containing matter immaterial for the use for which the ticket is employed. This is for the purpose of facilitating the tearing of the ticket in order to give the passenger a portion thereof and to prevent the liability of destroying any portion of the memorandum remaining.

It will be noticed that I provide in the parallel columns at the ends of the ticket for making the figures large and prominent by placing the figures in the adjacent columns in different horizontal position therein. Thus the "5" in the first column after "Transfer" is not in the same line with the "6" in the next adjacent column. This arrangement also prevents the liability in tearing the ticket from destroying the next adjoining figure.

In using my ticket it is advisable to have a paper-cutter of some kind, preferably the one described by me in my application for patent therefor, filed simultaneously herewith, for the purpose of tearing the portion of the ticket to be given to the passenger from the remaining portion to be retained by the conductor. The use of my ticket presupposes that each passenger is to be given a receipt for his fare. Thus when a passenger pays the conductor five cents, the usual fare, the conductor would tear off the ticket that portion extending from the upper right-hand corner to and including the column containing the figure "5" down to and including the words in the right-hand column, "Fare receipt," and give the same to the passenger. The remaining portion of the ticket the conductor would retain and hand in with the pad of tickets at the office. The passenger would then have a ticket or receipt containing the number, the direction he was traveling, the amount that he paid, and the date upon which the same was paid. The conductor would have a memorandum provided with the same number, the date, direction, and which would show that five cents had been paid for a fare received.

As the amounts of the cash payments increase from right to left at the top of the ticket, there could be nothing gained by the conductor in cutting off anything more from the memorandum retained, since by doing so it would require a larger payment by him to the office.

Providing a pass is given the conductor, it will be necessary for the conductor to hand it into the office, and the memorandum portion of the ticket will agree with the pass, showing the place to which the passenger was carried or transferred. In the same way when a transfer is given or received that fare is indicated on the memorandum retained by the conductor. Providing a transfer is given by a conductor to a passenger, that fact and the amount paid, the date on which it was paid, the direction that the car was going upon which it was paid, the place to which the fare is paid is shown by the memorandum retained, and when the transfer is taken up by the conductor on the intersecting road he (the conductor receiving it) cuts off and gives to the passenger that portion of ticket which contains the word "Transfer" in its upper horizontal column and in its vertical right-hand column the name of the place to which the transfer is issued.

If a passenger pays five cents and wants a transfer to go east on Hamilton Street, the conductor receives the five cents, cuts off the transfer down to "East on Hamilton St.," and gives it to the passenger. He then has a transfer-ticket indicating the direction and number of the fare paid to the conductor and the place where the intersecting line meets the Hamilton street line. The memorandum retained by the conductor shows that he has issued a transfer to go east on Hamilton street, and the amount of that transfer being five cents the conductor will be obliged to pay that amount to the company. For the purpose of tearing these portions of the tickets rapidly and accurately it is advisable to use some kind of a paper-cutter, although there may be perforations made between the places in the right-hand column and the columns containing that received for transportation in the upper end of the ticket.

I do not wish to limit myself to any particular manner for indicating the direction of movement of the car nor to the location of the calendar on the ticket nor to the names of the places or streets, as shown herein; but

What I claim as my invention, and desire to secure by Letters Patent, is—

1. An unalterable duplex ticket having matter thereon arranged in two portions, each portion containing in one column the names of the stations, and in another column, at right angles to the first-mentioned column, characters indicating values; a space intervening between said columns; with the number corresponding to the number indicated by the car-register on the payment of the fare, substantially as described.

2. An unalterable duplex ticket having matter thereon arranged in two portions, each portion containing in one column the names of the stations, and in another column at right angles to the first-mentioned column characters indicating values; a space intervening between said columns, with a means for indicating the number of the fare paid by the passenger, as indicated by the car-register, substantially as described.

3. An unalterable duplex ticket consisting of four columns placed along the sides and ends thereof respectively; a space intervening between said columns; the names of the stations placed in the columns along the sides of said ticket, respectively; characters indicating values placed in the columns along the ends of said ticket, respectively, substantially as described.

4. An unalterable duplex ticket of rectangular configuration; the names of the stations placed in duplicate along opposite sides thereof; characters indicating values placed along the other two opposite sides thereof; space intervening between the columns containing the values and the name columns; a means for indicating at both the upper and lower portions of said ticket the number of the fare paid by each passenger, as indicated by the car-register, substantially as described.

5. An unalterable duplex ticket having matter thereon arranged in two portions; like parts placed opposite each other; space intervening between like portions thereof; each portion containing in a single column the names of the stations, the date of issuance, direction of movement of the car and number of the fare paid by the passenger, as indicated by the car-register, and in another column at right angles thereto, and spaced therefrom characters indicating values, substantially as described.

Signed at Albany, New York, this 24th day of January, 1903.

JOSEPH J. McGUIRK.

Witnesses:
FREDERICK W. CAMERON,
DUDLEY B. WADE.